United States Patent [19]

Takahashi et al.

[11] Patent Number: 4,500,362

[45] Date of Patent: Feb. 19, 1985

[54] PROCESS FOR PREPARING AQUEOUS DISPERSION OF PIGMENT

[75] Inventors: Osamu Takahashi; Nobuo Yamamura; Yasuo Mukunoki, all of Kanagawa; Shungi Ogawa, Tokyo; Yutaka Nakagawa, Saitama, all of Japan

[73] Assignee: Fuji Photo Film Co., Ltd., Kanagawa, Japan

[21] Appl. No.: 552,188

[22] Filed: Nov. 15, 1983

[30] Foreign Application Priority Data

Nov. 15, 1982 [JP] Japan .................................. 57-200862

[51] Int. Cl.$^3$ .......................... C09C 1/00; C09B 1/00; C04B 31/40
[52] U.S. Cl. ............................... 106/309; 106/308 N; 106/308 Q; 106/308 R
[58] Field of Search ........... 106/308 R, 308 N, 308 Q, 106/309

[56] References Cited

U.S. PATENT DOCUMENTS 3,348,959 10/1967 Csonra et al. ........................ 606/309
4,194,921 3/1980 Wheeler et al. ................. 106/308 N
4,227,936 10/1980 Osswald et al. ................. 106/308 N Primary Examiner—Herbert S. Cockeram
Attorney, Agent, or Firm—Sughrue, Mion, Zinn, Macpeak, and Seas

[57] ABSTRACT

A process for preparing an aqueous dispersion of a pigment is disclosed. The process involves providing a surface active agent having a solubility of 0.1% or less in water at a temperature of about 25° C. The agent is also soluble in an organic solvent. The agent is dispersed in water to provide an aqueous dispersion of the agent. The pigment is then dispersed in the aqueous dispersion of the agent to form the aqueous dispersion of the pigment. The dispersion causes less foaming, aggregation and sedimentation of the pigment particles when the dispersion is stored. The dispersion is particularly useful when utilizing carbon black as the pigment and applying the dispersion to the field of photographic materials. The presence of the surface active agent does not have secondary effects on photographic materials.

11 Claims, No Drawings

PROCESS FOR PREPARING AQUEOUS DISPERSION OF PIGMENT

FIELD OF THE INVENTION

This invention relates to a novel aqueous dispersion of a dye or a pigment, and to a process for dispersing them.

BACKGROUND OF THE INVENTION

Aqueous dispersions of dyes or pigments have heretofore been widely used in connection with various applications, for example, in dope-dyeing of vinylon or viscose, paper-making, aqueous paints, and as colorants for metals such as aluminum and iron, and the like.

In particular, an aqueous dispersion of carbon black is in use in photographic light-sensitive materials mainly for obtaining black color or light barrier properties, as well as in aqueous printing inks, aqueous paints, and cosmetics.

Carbon blacks are grouped into furnace black, channel black, lamp black, thermal black, acetylene black, etc., according to production process, and they are different from each other in surface properties such as surface functional groups and surface area. Surface functional groups include a carboxyl group, a phenolic hydroxy group, a quinone group and a lactone group. These groups have been observed through infrared absorption spectrum, polarograph, or the like (J. V. Hallum et al., J. Phys. Chem., 62, 110 (1958) and M. L. Studbaker et al., Ing. Eng. Chem., 48, 162 (1956)). These functional groups are chemically adsorbed directly on carbon black particles or, in other cases, polycyclic aromatic substances having quinone groups, carboxy groups, or the like adsorbed on or occluded in carbon black particles.

In addition, carbon black generally contains sulfur compounds or the like and adsorbs various substances depending upon the physical conditions of the surface such as surface area and porosity. Therefore, carbon black is a substance fairly active chemically and physically. On the other hand, in preparation of an aqueous dispersion of carbon black, it is of importance to stably disperse carbon black particles in water in order to improve quality. In general, dyes and pigments (hereinafter dyes and pigments being referred to as "pigments") are dispersed in an aqueous system according to the following processes of:

(1) finely pulverizing a pigment through mechanical means such as an atomizer, ball mill, pebble mill, colloid mill, etc.; and (2) forming primary particles of the pigment using a dispersing agent such as a surface active agent or a phosphate.

A dispersion state of a pigment attained by applying mechanical or physical energy as process (1) is not stable and, in order to obtain a stable dispersion system, dispersion process (2) using a dispersing agent such as a surface active agent is employed. With pigments poorly wettable with water such as carbon black, it is generally difficult to obtain a stable dispersion system without using a dispersing agent.

It is well known to use a carbon black aqueous dispersion in a photographic light-sensitive material system (Research Disclosure, 15162, November 1976). A carbon black aqueous dispersion for use in the photographic light-sensitive material system has so far been prepared in the same manner as an ordinary carbon black dispersion by adding powder type or bead type carbon black to water having dissolved therein a water-soluble surface active agent (for example, salts of polyacrylic acid, alkylnaphthalenesulfonic acid, formaldehyde-condensed naphthalenesulfonic acid, or polystyrenesulfonic acid as described in Research Disclosure, 15162 (November 1976)), coarsely dispersing carbon black using a coarsely dispersing machine such as a high-speed stirring tyep dispersing machine (e.g., a dissolver as described in Japanese patent application (OPI) No. 129136/80 (the term "OPI" as used herein refers to a "published unexamined Japanese patent application")), and finely dispersing the resultant carbon black using a fine dispersing machine such as a sand grinder, homogenizer, colloid mill, or the like to obtain an aqueous dispersion of carbon black particles having a mean particle size of about 0.1 to about 10 μm.

In an instant film of the type as described in Photogr. Sci. Eng., 20, 155 (1976), it is known to use a carbon black aqueous dispersion in a processing solution or in a light-sensitive layer for the purpose of intercepting light. However, the use of the carbon black dispersion prepared according to the above-described conventional dispersion process in this type processing solution has involved the following defects.

That is, in comparison with the case of using a processing solution not containing the carbon black aqueous dispersion (i.e., processing in dark room), deteriorated photographic properties result (maximum density of dye and minimum density), serious deterioration of the processing solution with time, and poor preservability of processed light-sensitive materials.

Analysis of the causes for these defects by the present inventors has led to the following conclusions:

(1) Since carbon black itself is chemically and physically active as described hereinbefore, it mutually acts with the ingredients in the processing solution (for example, developing solution) to gradually deteriorate properties of the solution. This phenomenon becomes more conspicuous as the time of mechanically pulverizing the carbon black becomes longer. This deterioration is caused by chemical activation of the surface of carbon black particles due to application of mechanical energy whereby the surface is flawed.

(2) The surface active agent used for dispersing carbon black particles penetrates into a light-sensitive material upon processing it to adversely affect development of a photographic emulsion or deteriorate film properties of the processed light-sensitive material, thus exerting unfavorable influences on preservability of the light-sensitive material. This tendency becomes more conspicuous as the amount of the surface active agent is increased for improving dispersibility of carbon black.

With conventional carbon black aqueous dispersions, surface active agents must be used in large amounts for improving dispersibility of carbon black. The use of the surface active agent in a large amount causes foaming to decrease workability, forms pinholes which causes incomplete interception of light when the resulting dispersion is used in a processing solution or in a light-sensitive layer for intercepting light, and causes uneven coating.

On the other hand, an aqueous dispersion of a dye or a pigment other than carbon black is prepared by dispersing a varying organic dye or pigment or inorganic pigment in an aqueous medium using a varying dispersing agent. However, serious foaming occurs upon dispersing the dye or pigment due to the action of the surface active agent, which deteriorates workability.

A further general problem is aggregation and sedimentation of dye or pigment particles during storage, which leads to deterioration of a coloring effect on materials to be colored.

SUMMARY OF THE INVENTION

It is, therefore, an object of the present invention to provide an aqueous dispersion of a dye or a pigment, which causes less foaming and less aggregation and sedimentation of the dye or pigment particles during storage.

Another object of the present invention is to provide an aqueous dispersion of a dye or a pigment (particularly carbon black) which is chemically (particularly photographically) more inert than conventional dispersions.

A further object of the present invention is to provide a photographic light-sensitive material which does not exert secondary adverse influences and which has improved film properties.

Still a further object of the present invention is to provide a color photographic light-sensitive material which does not have the defects of conventional materials.

Other objects of the present invention will become apparent from the following descriptions.

These objects of the present invention can be attained by the following process: that is, a process of preparing an aqueous dispersion of a pigment by dispersing at least one pigment in water or in a hydrophilic colloid composition, which process involves a first step of preparing an aqueous dispersion of a surface active agent insoluble in water and soluble in an organic solvent and a second step of dispersing a pigment using the aqueous dispersion obtained in the first step. The phrase "insoluble in water" as used herein means having a solubility of 0.1% or less in water at an ordinary temperature.

DETAILED DESCRIPTION OF THE INVENTION

In a preferable embodiment, the solubility of the above-described surface active agent in water is 0.05% or less.

The surface active agents include ionic surface active agents and nonionic surface active agents. Ionic surface active agents include anionic surface active agents such as carboxylates, sulfuric ester salts, sulfonates, phosphoric ester salts, etc., cationic surfactants such as primary amine salts, secondary amine salts, tertiary amine salts, quaternary ammonium salts, pyridinium salts, etc., and amphoteric surface active agents such as amino salts type and betaine type ones, and nonionic surface active agents include polyethylene glycol type, polyhydric alcohol type, etc. Typical examples of these surface active agents are illustrated in, for example, Handbook of Oils and Fats Chemistry, pp. 653–664 (compiled by Nippon Yukagaku Kyokai), Collective Documents on Dispersing Technology, pp. 255 to 257 (published by Keiei Kaihatsu Center Shuppan-bu), Synthesis and Application of Surfactants (published by Maki Shoten), and Surface Active Agents and Detergents, Vol. I (written by A. M. Schwarz and J. W. Perry), and the like.

Surface active compounds preferably used in connection with the present invention are illustrated below. However, the invention is not limited to these examples.

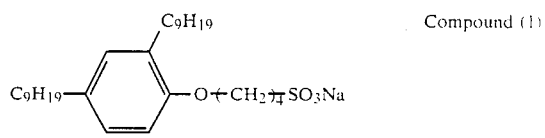

Compound (1)

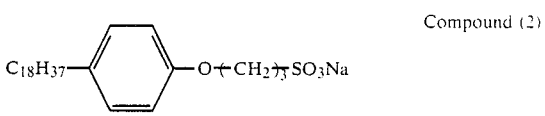

Compound (2)

Compound (3)

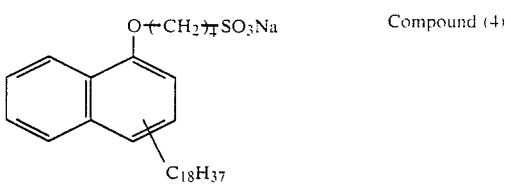

Compound (4)

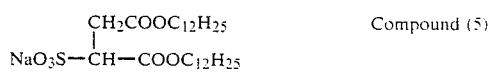

Compound (5)

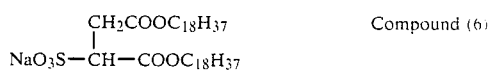

Compound (6)

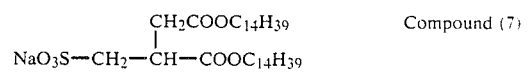

Compound (7)

$C_{15}H_{31}COOK$

Compound (8)

Compound (9)

Compound (10)

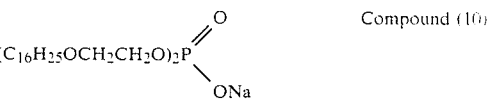

Compound (11)

x:y = 5.5:4.5
x + y ≈ 7

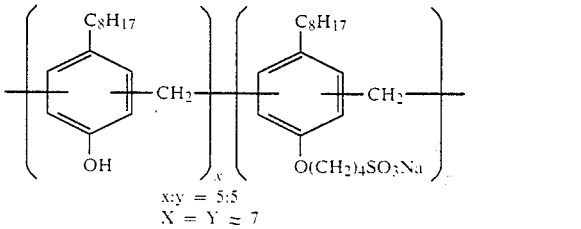

Compound (12)

x:y = 5:5
X = Y ≈ 7

-continued

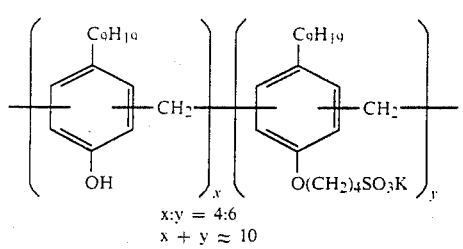
Compound (13)
x:y = 4:6
x + y ≈ 10

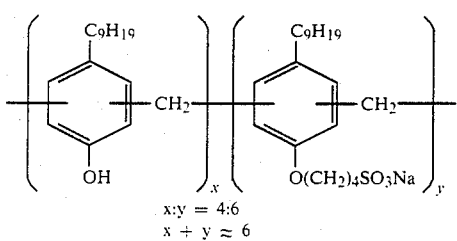
Compound (14)
x:y = 4:6
x + y ≈ 6

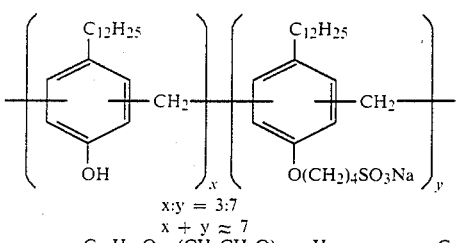
Compound (15)
x:y = 3:7
x + y ≈ 7

C$_{18}$H$_{37}$O—(CH$_2$CH$_2$O)$_{10}$—H  Compound (16)

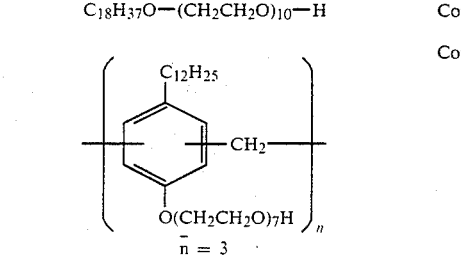
Compound (17)
n̄ = 3

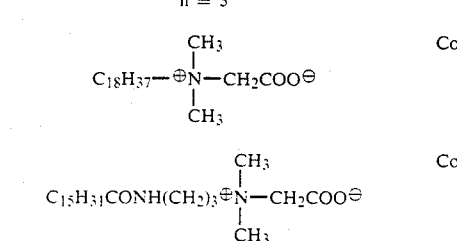
Compound (18)

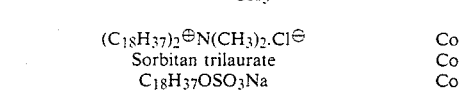
Compound (19)

(C$_{18}$H$_{37}$)$_2$⊕N(CH$_3$)$_2$.Cl⊖  Compound (20)
Sorbitan trilaurate  Compound (21)
C$_{18}$H$_{37}$OSO$_3$Na  Compound (22)

The above-illustrated water-insoluble and organic solvent-soluble surface active agents are not completely dissolved in water when added to 100 ml of water in an amount of 0.1 g at an ordinary temperature (25° C.) and left for 72 hours. That is, they are surface active agents which are dissolved in a concentration of less than 0.1% (wt (g)/volume (ml)).

The above-described surface active agents (1) to (22) have solubilities in water of 0.05% (weight/volume) or less.

In general, any organic solvent can be used provided it can dissolve the surface active agent slightly soluble in water and further provided that when it is used alone or in combination with water, it can form an aqueous emulsion. Usually, however, the solvent must have no adverse effects on the formation of the aqueous emulsion. Further, if removal of the solvent is required, it should have a fast evaporation rate even in the copresence of water. Examples of such solvents include those described in, for example, Solvent Handbook. Examples of the solvent compounds include methanol, ethanol, isopropanol, butanol, ethyl acetate, isopropyl acetate, acetone, methyl ethyl ketone, tetrahydrofuran, cyclohexane, benzene, toluene, dioxane, acetonitrile, etc.

An aqueous emulsion of the surface active agent to be used in the present invention is prepared according to either of the following processes.

(1) The surface active agent of the present invention is first dissolved in an organic solvent and emulsified in water using an emulsifying apparatus such as a colloid mill, homogenizer, dissolver, electromagnetic distortion type ultrasonic generator or the like. This process is the emulsifying process usually employed.

(2) The surface active agent of the present invention is dissolved in a mixed solvent of an organic solvent and water, and the resulting solution is self-emulsified by distilling off the organic solvent.

The surface active agents to be used in the present invention are soluble in organic solvents and are dissolved in a concentration of 1% (by weight) or more, preferably 5% or more, at 70° C. or less in at least one low-boiling organic solvent having a boiling point of 170° C. or less at ordinary pressure.

Dyes or pigments to be used in the present invention include organic dyes and pigments and inorganic pigments such as azo type dyes, phthalocyanine dyes, quinacridone type dyes, anthraquinone type dyes, dioxadine type dyes, indigo type dyes, perylene type dyes, titanium oxide, cadmium series pigments, iron oxide type pigments, chromium oxide, carbon black, etc. In addition, known dyes and mixtures thereof conventionally used as colorants may be used. These dyes and pigments to be used in the present invention may be used in any state such as an as-produced aqueous paste or as powder, and the contents in the aqueous medium are not technically limited. However, in view of economical considerations, the dyes and the pigments are used in concentrations of from 5 to 70 wt%, preferably from 10 to 50 wt%.

Of the pigments to be used in the present invention, carbon black is particularly preferable, because, when the dispersing process of the present invention is applied to carbon black, a chemically inert aqueous dispersion can be obtained.

The water-insoluble, organic solvent-soluble surface active agents to be used in the present invention may be used alone or in combination of two or more of them in amounts of usually 0.5 to 100 wt%, preferably from 3 to 50 wt%, based on the weight of the dye or pigment.

The above-described water-insoluble, organic solvent-soluble surface active agent is a necessary ingredient in the aqueous dispersion of the present invention. It is of course possible to further use, if necessary, conventionally known anionic, nonionic, or cationic dispersing agents, surface active agents, and protective colloids such as a water-soluble polymer.

The pigment aqueous dispersion prepared by the process of the present invention is used for aqueous printing inks, aqueous paints, and cosmetics and, in addition, can be added to a light-intercepting processing solution in photographic light-sensitive materials, for example, color diffusion transfer film units or to a light barrier layer previously provided in the film unit. When used in the light barrier described above, the aqueous dispersion can provide a large $D_{max}$, a small $D_{min}$, and an increased light resistance of processed color images.

EXAMPLE 1

(1) Preparation of Self-Emulsified Emulsion 140 parts by weight of water and 48 parts by weight of methyl ethyl ketone were charged in a vacuum distillation apparatus, and 12 parts by weight of Compound (11) was added thereto by portions under stirring.

The resulting mixture easily became a uniform, slightly yellowish white-turbid semitransparent solution. The temperature of this solution was then raised to 55° C. to start distillation under reduced pressure.

The pressure within the apparatus reached a theoretical saturated vapor pressure of water, 118 mm Hg, in about 1 hour and the content became a white emulsion. After continuing this operation for another 30 minutes, the pressure was restored to ordinary pressure and the solution temperature was reduced to 25° C., followed by taking out the content to obtain 106 parts by weight of an end product containing 10.6% solids (pH 7.9).

The emulsion was subjected to the measurement of particle size according to a light-scattering method to find that the mean particle size was 0.24μ.

(2) Preparation of a Pigment Aqueous Solution Using the Above-Prepared Self-Emulsified Emulsion as a Dispersing Agent 61.3 parts by weight of an O/W emulsion containing 10.6% of Compound (11), prepared in (1), was added to 175 parts by weight of water and, under stirring, 65 parts by weight of bead-type carbon black was added thereto by portions to obtain a pigment slurry having good fluidity.

This slurry was repeatedly subjected to dispersing treatment ten times according to general procedures using a sand grinder containing glass beads to thereby obtain 283 parts by weight of an end product containing 23.7% of solids (21.6% of the pigment) and having a pH of 8.2.

A part of the thus obtained end product was taken up, diluted with water to a pigment concentration of 0.5%, and observed under an optical microscope to find that the pigment particle size was 5μ or less and that the dispersing state was good.

When this end product was allowed to stand for 3 months in a closed vessel, it maintained the same dispersion degree as that immediately after its preparation, thus being a stable carbon black aqueous dispersion (hereinafter referred to as carbon black aqueous dispersion (a)).

COMPARATIVE EXAMPLE 1

6.5 parts by weight of sodium dodecylbenzenesulfonate was dissolved in 240 parts by weight of water and, under stirring, 65 parts by weight of the aforesaid beadlike carbon black was added thereto. The resulting mixture was then subjected to the same dispersing procedure as in Example 1 to obtain 294 parts by weight of a comparative sample 1 containing 23.0% of solids (20.9% of pigment) and having a pH of 7.4 (carbon black aqueous dispersion (b)).

COMPARATIVE EXAMPLE 2

In the same manner as with comparative sample 1 except for using 13 parts by weight of polyoxyethylene nonylphenol ether (mol number of added ethylene oxide: 31 mols), 302 parts by weight of comparative sample 2 containing 24.5% of solids (20.5% of pigment) and having a pH of 8.0 (carbon black aqueous dispersion (c)) was obtained.

EXAMPLE 2

Viscous processing solutions (A), (B) and (C) having the following formulations were prepared using carbon black aqueous dispersion (a) prepared in Example 1 and carbon black aqueous dispersions (b) and (c) shown in Comparative Examples 1 and 2 and prepared in a conventional manner.

In addition, as another comparative processing solution, carbon black-free viscous processing solution (D) was also prepared.

Each of the processing solutions was sealed in a pressure-rupturable pod-like vessel under a nitrogen atmosphere, and stored at 50° C. for 1 week or at 25° C. for 1 week. Photographic properties of photographic light-sensitive materials processed with these processing solutions were examined in the following manner.

Viscous Processing Solution (A)

The following chemicals were added to the aforesaid carbon black aqueous dispersion (a) containing 148 g of carbon black, and water was added thereto to make the total amount 1 kg.

| 1-p-Tolyl-4-hydroxymethyl-4-methyl-3-pyrazolidone | 8 g |
| --- | --- |
| Methylhydroquinone | 0.3 g |
| 5-Methylbenzotriazole | 3.5 g |
| Sodium sulfite (anhydrous) | 0.2 g |
| Carboxymethyl cellulose sodium salt | 58 g |
| Potassium hydroxide | 56 g |
| Benzyl alcohol | 1.5 cc |

Viscous Processing Solution (B)

Carbon black aqueous dispersion (a) containing 148 g of carbon black in the formulation of viscous processing solution (A) was substituted by carbon black aqueous dispersion (b) containing 148 g of carbon black, and water was added to the resulting composition to make the total amount 1 kg.

Viscous Processing Solution (C)

Carbon black aqueous dispersion (a) containing 148 g of carbon black in the formulation of viscous processing solution (A) was substituted by carbon black aqueous dispersion (c) containing 148 g of carbon black, and water was added to the resulting composition to make the total amount 1 kg.

Viscous Processing Solution (D)

Carbon black was removed from the formulation of viscous processing solution (A), and water was added to the composition to make the total 1 kg.

A light-sensitive sheet having the following structure was exposed through an optical wedge of 0.2 in density difference using a 2854° K. tungsten light, and fixedly laminated on the following cover sheet in a face-to-face relationship, while integrating the aforesaid pressure-rupturable pod between and at the end of the two elements so as to spread a processing solution between them. Then, the processing solution was spread therebetween at 25° C. by means of a pressure-applying member in order to promote development. The density of the transferred image 1 day after the development was measured by means of a color densitometer. (With viscous processing solution (D), the processing was conducted in a dark room for intercepting light.)

Light-Sensitive Sheet

On a transparent polyethylene terephthalate film support were coated in sequence the following layers to prepare a light-sensitive sheet.

(1) A mordant layer containing 3.0 g/m² of copoly(s-tyrene-N-vinylbenzyl-N,N-trihexylammonium chloride) and 3.0 g/m² of gelatin.

(2) A light-reflecting layer containing 20 g/m² of titanium dioxide and 2.0 g/m² of gelatin.

(3) A light barrier layer containing 3.0 g/m² of carbon black and 2.0 g/m² of gelatin.

(4) A layer containing 0.44 g/m² of a cyan dye-releasing redox compound of the following structural formula:

(5) A layer containing 10.3 g/m² of silver of a red-sensitive, internal latent image-forming, direct reversal silver bromide emulsion, 1.2 g/m² of gelatin, 0.05 mg/m² of a nucleating agent of the following structural formula:

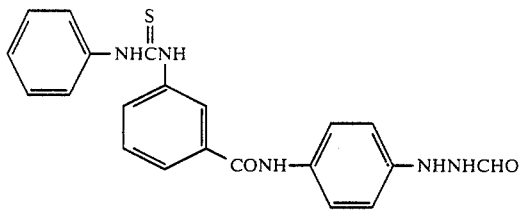

and 0.13 g/m² of 2-sulfo-5-n-pentadecylhydroquinone sodium salt.

(6) A color stain-preventing agent-containing layer containing 1.0 g/m² of 2,5-di-t-pentadecylhydroquinone and 0.8 g/m² of gelatin.

(7) A layer containing 0.21 g/m² of magenta dye-releasing redox compound of the following structural formula I, 0.11 g/m² of a magenta dye-releasing redox

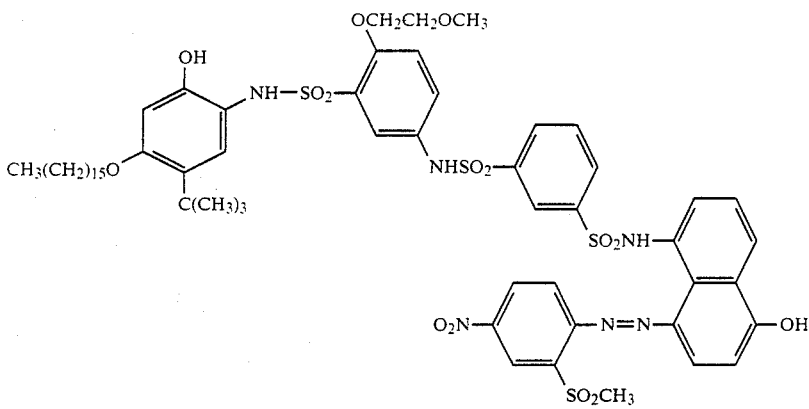

0.09 g/m² of tricyclohexyl phosphate, and 0.8 g/m² of gelatin.

compound of the structural formula II, 0.08 g/m² of tricyclohexyl phosphate, and 0.9 g/m² of gelatin.

Structural Formula I:

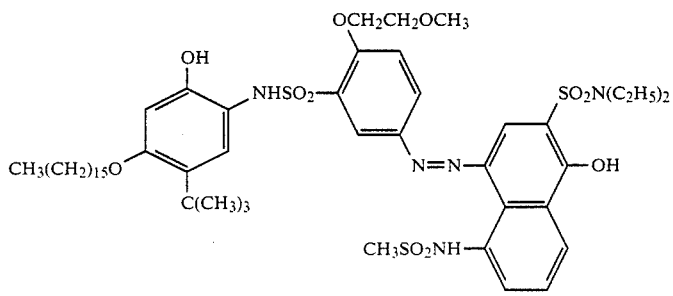

Structural Formula II:

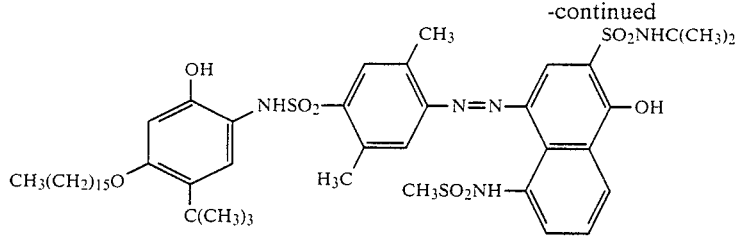

(8) A layer containing 0.82 g/m² of silver of a green-sensitive, internal latent image-forming, direct reversal silver bromide emulsion, 0.9 g/m² of gelatin, 0.03 mg/m² of the same nucleating agent as used in layer (5), and 0.08 g/m² of 2-sulfo-5-n-pentadecylhydroquinone sodium salt.

(9) The same as layer (6).

(10) A layer containing 0.53 g/m² of a yellow dye-releasing redox compound of the following structural formula:

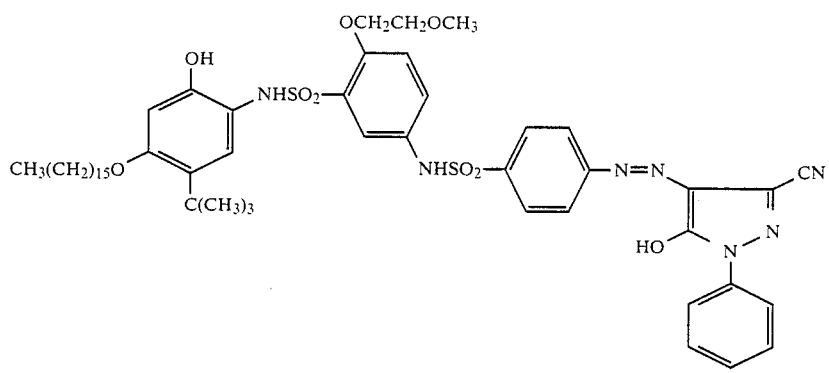

0.13 g/m² of tricyclohexyl phosphate, and 0.7 g/m² of gelatin.

(11) A layer containing a blue-sensitive, internal latent image-forming, direct reversal silver bromide emulsion, 1.1 g/m² of gelatin, 0.04 mg/m² of the same nucleating agent as used in layer (5), and 0.07 g/m² of 2-sulfo-5-n-pentadecylhydroquinone sodium salt.

(12) A layer containing 1.0 g/m² of gelatin.

On a transparent polyester support were coated in sequence the following layers (1') to (3') to prepare a cover sheet.

(1') A layer containing 22 g/m² of a copolymer of acrylic acid and butyl acrylate (80:20 by weight) and 0.44 g/m² of 1,4-bis(2,3-epoxypropoxy)butane.

(2') A layer containing 3.8 g/m² of acetyl cellulose (yielding 39.4 g of acetyl group by hydrolysis of 100 g of acetyl cellulose), 0.2 g/m² of a copolymer (molecular weight: about 50,000) of styrene and maleic anhydride (60:40 by weight), and 0.115 g/m² of 5-(β-cyanoethylthio)-1-phenyltetrazole.

(3') A layer containing 2.5 g/m² of a latex of copolymer of vinylidene chloride, methyl acrylate, and acrylic acid (85:12:3 by weight) and 0.05 g/m² of polymethyl methacrylate latex (particle size: 1 to 3 μm).

The results thus obtained are shown in Table 1.

TABLE 1

| | | Storage Conditions | | | |
|---|---|---|---|---|---|
| | | 25° C., 1 Week Reflection Density | | 50° C., 1 Week Reflection Density | |
| | | Maximum Density | Minimum Density | Maximum Density | Minimum Density |
| Viscous Processing Solution (A) | Yellow Density | 1.82 | 0.23 | 1.81 | 0.22 |
| | Magenta Density | 2.15 | 0.23 | 2.16 | 0.22 |
| | Cyan Density | 2.12 | 0.32 | 2.13 | 0.31 |
| Comparative Viscous Processing Solution (B) | Yellow Density | 1.79 | 0.24 | 1.51 | 0.25 |
| | Magenta Density | 2.08 | 0.24 | 2.00 | 0.24 |
| | Cyan Density | 1.98 | 0.35 | 1.97 | 0.34 |
| Comparative Viscous Processing Solution (C) | Yellow Density | 1.78 | 0.24 | 1.50 | 0.24 |
| | Magenta Density | 2.09 | 0.23 | 1.98 | 0.23 |
| | Cyan Density | 1.97 | 0.34 | 1.96 | 0.34 |
| Comparative Viscous Processing Solution (D) | Yellow Density | 1.83 | 0.23 | 1.82 | 0.22 |
| | Magenta Density | 2.14 | 0.23 | 2.14 | 0.22 |
| | Cyan Density | 2.13 | 0.33 | 2.12 | 0.32 |

It is seen from Table 1 that viscous processing solution (A) using carbon black aqueous dispersion of the present invention provided about the same yellow maximum density under the storage condition of 50° C.-one week as that under the storage condition of 25° C.-one week, as with viscous processing solution (D) not containing the carbon black aqueous dispersion. Accordingly, the viscous processing solution (A) clearly has excellent stability with time. However, with comparative viscous processing solutions (B) and (C), the yellow maximum density obtained under the storage condition of 50° C.-one week was substantially less than that obtained under the storage condition of 25° C.-one week. Accordingly, the viscous processing solutions (B) and (C) have poor stability with time. This may be attributed to the extremely inert chemical properties of the carbon black aqueous dispersion (a).

While the invention has been described in detail and with reference to specific embodiments thereof, it will be apparent to one skilled in the art that various changes and modifications can be made therein without departing from the spirit and scope thereof.

What is claimed is:

1. A process for preparing an aqueous dispersion of a pigment, comprising the steps of:
    dissolving in a mixture of water and an organic solvent an ionic surface active agent which is insoluble in water or has a solubility of 0.1% or less in water at a temperature of 25° C., the ionic surface active agent being soluble in the organic solvent thereby forming a solution;
    removing the organic solvent from the solution by distillation to provide an aqueous emulsion of the ionic surface active agent; and
    dispersing a pigment in the form of particles in the aqueous dispersion of the ionic surface active agent to form an aqueous dispersion of the pigment.

2. A process for preparing an aqueous dispersion of a pigment as claimed in claim 1, wherein the surface active agent has a solubility of 0.05% or less in water at a temperature of about 25° C.

3. A process for preparing an aqueous dispersion of a pigment as claimed in claim 1, wherein the organic solvent is selected from the group consisting of methanol, ethanol, isopropanol, butanol, ethyl acetate, isopropyl acetate, acetone, methyl ethyl ketone, tetrahydrofuran, cyclohexane, benzene, toluene, dioxane, and acetonitrile.

4. A process for preparing an aqueous dispersion of a pigment as claimed in claim 1, wherein the surface active agent is soluble in the organic solvent in an amount of 1% by weight or more at 70° C. or less, the organic solvent having a boiling point of 160° C. or less at about ordinary pressure.

5. A process for preparing an aqueous dispersion of a pigment as claimed in claim 4, wherein the surface active agent is soluble in the organic solvent in an amount of 5% by weight or more at 70° C. or less.

6. A process for preparing an aqueous dispersion of a pigment as claimed in claim 1, wherein the pigment is present in an amount in the range of 5 to 70 wt% based on the weight of the aqueous dispersion of the pigment.

7. A process for preparing an aqueous dispersion of a pigment as claimed in claim 6, wherein the pigment is present in an amount in the range of 10 to 50 wt% based on the weight of the aqueous dispersion of the pigment.

8. A process for preparing an aqueous dispersion of a pigment as claimed in claim 1, wherein the pigment is a carbon black.

9. A process for preparing an aqueous dispersion of a pigment as claimed in claim 1, wherein the surface active agent is present in an amount in the range of 0.5 to 100 wt% based on the weight of the pigment.

10. A process for preparing an aqueous dispersion of a pigment as claimed in claim 9, wherein the surface active agent is present in an amount in the range of from about 3 wt% to about 50 wt% based on the weight of the pigment.

11. A process for preparing an aqueous dispersion of a pigment as claimed in claim 1, wherein the surface active agent is a compound selected from the group consisting of:

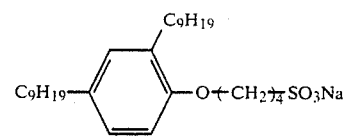

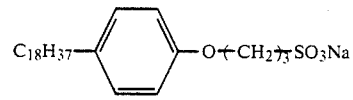

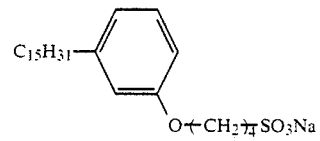

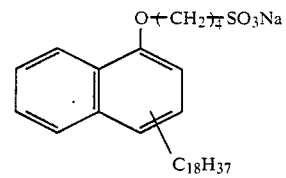

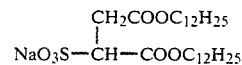

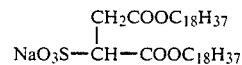

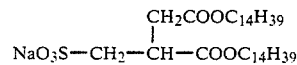

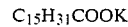

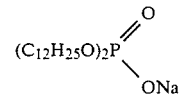

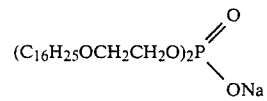

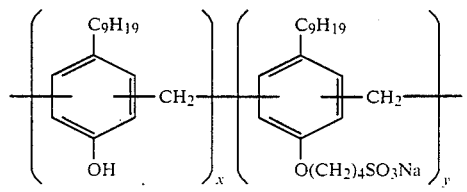

$x:y = 5.5:4.5$
$x + y \approx 7$

-continued
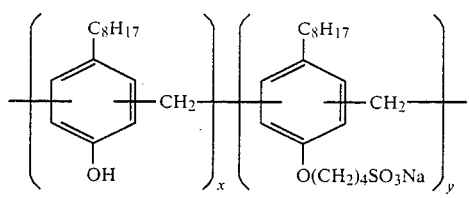
x:y = 5:5
X = Y ≈ 7
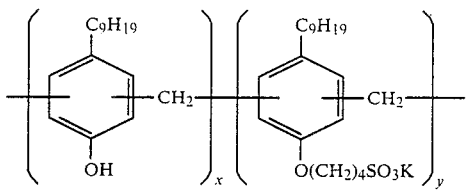
x:y = 4:6
x + y ≈ 10
-continued
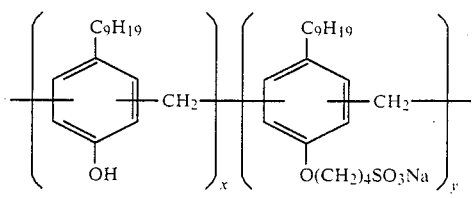
x:y = 4:6
x + y ≈ 6
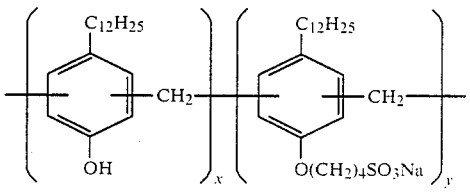
x:y = 3:7
x + y ≈ 7
$$C_{18}H_{37}-\overset{CH_3}{\underset{CH_3}{\overset{|}{\underset{|}{N}}}}{}^{\oplus}-CH_2COO^{\ominus}$$
$$C_{15}H_{31}CONH(CH_2)_3-\overset{CH_3}{\underset{CH_3}{\overset{|}{\underset{|}{N}}}}{}^{\oplus}-CH_2COO^{\ominus}$$
$C_{18}H_{37}OSO_3Na$
and
$(C_{18}H_{37})_2{}^{\oplus}N(CH_3)_2 \cdot Cl^{\ominus}$.
* * * * *